US012568087B2

(12) United States Patent
Ford et al.

(10) Patent No.: US 12,568,087 B2
(45) Date of Patent: Mar. 3, 2026

(54) PRESCRIPTIVE ANALYTICS FOR ACCESS GOVERNANCE

(71) Applicant: Oracle International Corporation, Redwood Shores, CA (US)

(72) Inventors: Bryon Ford, St. George, UT (US); Ilya Bolotin, Little Elm, TX (US); Giri Kothapalli, Allen, TX (US); Joseph Gillette, Dallas, TX (US); Jason Cotton, Leander, TX (US)

(73) Assignee: Oracle International Corporation, Redwood Shores, CA (US)

( * ) Notice: Subject to any disclaimer, the term of this patent is extended or adjusted under 35 U.S.C. 154(b) by 140 days.

(21) Appl. No.: 18/653,335

(22) Filed: May 2, 2024

(65) Prior Publication Data

US 2025/0343796 A1 Nov. 6, 2025

(51) Int. Cl.
*H04L 9/40* (2022.01)
(52) U.S. Cl.
CPC ................................. *H04L 63/101* (2013.01)
(58) Field of Classification Search
CPC .................................................... H04L 63/101
See application file for complete search history.

(56) References Cited

U.S. PATENT DOCUMENTS

| | | | |
|---|---|---|---|
| 2017/0180378 A1* | 6/2017 | Tyler | H04L 63/1433 |
| 2020/0120097 A1* | 4/2020 | Amitay | G06F 3/0488 |
| 2022/0385668 A1* | 12/2022 | Simonetti | H04L 63/20 |
| 2023/0208849 A1* | 6/2023 | Zaki | G06F 16/28 |
| | | | 726/4 |
| 2023/0267225 A1* | 8/2023 | Costello | G06F 21/6227 |
| | | | 726/27 |
| 2023/0401945 A1* | 12/2023 | Benson | H04L 9/3236 |

* cited by examiner

*Primary Examiner* — Yonas A Bayou
(74) *Attorney, Agent, or Firm* — Invoke

(57) ABSTRACT

Techniques for access governance are disclosed, including: computing, based on attributes associated with users having one or more access permissions in common, an aggregate similarity score of the users; computing, based at least on the attributes, an individual similarity score between the users and a target user, where the target user has the one or more access permissions or the target user requests to have the one or more access permissions; determining, based at least on the individual similarity score and the aggregate similarity score, a recommended action with respect to the one or more access permissions for the target user, where the recommended action includes one of (a) administrative review or (b) administrative approval of the one or more access permissions for the target user; and generating a notification of the recommended action with respect to the one or more access permissions for the target user.

20 Claims, 12 Drawing Sheets

```
1.  AGG_SIM
2.  AGG_SIM_ZSCORE
3.  JOBCODE_LOC_PEER_SIM
4.  JOBCODE_LOC_PEER_SIM_IGA
5.  JOBCODE_PEER_SIM
6.  JOBCODE_PEER_SIM_IGA
7.  LOC_PEER_SIM
8.  LOC_PEER_SIM_IGA
9.  MANAGER_LOC_PEER_SIM
10. MANAGER_LOC_PEER_SIM_IGA
11. MANAGER_PEER_SIM
12. MANAGER_PEER_SIM_IGA
13. NUM_DIRECTS
14. NUM_PEERS_BY_JOBCODE
15. NUM_PEERS_BY_JOBCODE_AND_LOC
16. NUM_PEERS_BY_JOBCODE_C2A
17. NUM_PEERS_BY_LOC
18. NUM_PEERS_BY_LOC_C2A
19. NUM_PEERS_BY_MANAGER
20. NUM_PEERS_BY_MANAGER_AND_LOC
21. NUM_PEERS_BY_MANAGER_C2A
22. NUM_PEERS_BY_ORG
23. NUM_PEERS_BY_ORG_AND_LOC
24. NUM_PEERS_BY_ORG_C2A
25. ORG_LOC_PEER_SIM
26. ORG_LOC_PEER_SIM_IGA
27. ORG_PEER_SIM
28. ORG_PEER_SIM_IGA
```

PRESCRIPTIVE ANALYTICS FOR ACCESS GOVERNANCE

TECHNICAL FIELD

The present disclosure relates to access governance in computer systems. In particular, the present disclosure relates to evaluating and managing user access permissions.

BACKGROUND

In computer systems, access governance refers to the process of regulating who can access what resources within a computing environment. Access governance is a fundamental aspect of computer security and is crucial for protecting sensitive data, maintaining system integrity, and ensuring proper functionality. Access governance mechanisms typically use a combination of hardware, software, and procedural measures to enforce security policies. As the number of users increases (e.g., in enterprise environments with a potentially very large number of users), it becomes increasingly difficult to ensure that users have the correct permissions without either (1) granting the wrong user(s) access to resources, which can jeopardize system security and integrity, or (2) failing to grant the right user(s) access to resources, which can prevent those resources from being used as intended.

Access governance administrators sometimes seek to evaluate existing access permissions, to identify access permissions that present a risk. However, determining what constitutes risk during an access review can be difficult and arbitrary. Many factors inform the risk level, such as the resource to be accessed and its sensitivity, the user's organization, job code, or employment type (i.e., full-time vs contractor), among others.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates an example of feature engineering in accordance with one or more embodiments;

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. SYSTEM ARCHITECTURE
3. ACCESS GOVERNANCE
4. EXAMPLE EMBODIMENTS
5. PRACTICAL APPLICATIONS, ADVANTAGES & IMPROVEMENTS
6. COMPUTER NETWORKS AND CLOUD NETWORKS
7. HARDWARE OVERVIEW
8. MISCELLANEOUS; EXTENSIONS

1. GENERAL OVERVIEW

One or more embodiments use prescriptive analytics for access governance. Prescriptive analytics uses computational techniques to recommend actions for businesses or individuals. Unlike descriptive and predictive analytics, which focus on understanding past data and predicting future outcomes, prescriptive analytics provides actionable insights and recommendations. In particular, one or more embodiments use prescriptive analytics to generate recommendations relating to existing and/or requested access permissions.

One or more embodiments compute aggregate similarities among users based on multiple attributes and contextual factors, to identify patterns and anomalies in permission assignments with greater accuracy and efficiency. Specifically, one or more embodiments compute an aggregate similarity among users with shared access permissions by analyzing multiple attributes, and calculate the similarity between this user group and a specific target user based on the same attributes. One or more embodiments further generate a recommended action of (a) administrative review or (b) administrative approval of access permissions for the target user. The recommended action may be accompanied by a human-readable explanation of the factors that informed the recommendation.

One or more embodiments described in this Specification and/or recited in the claims may not be included in this General Overview section.

2. SYSTEM ARCHITECTURE

Figure 1:
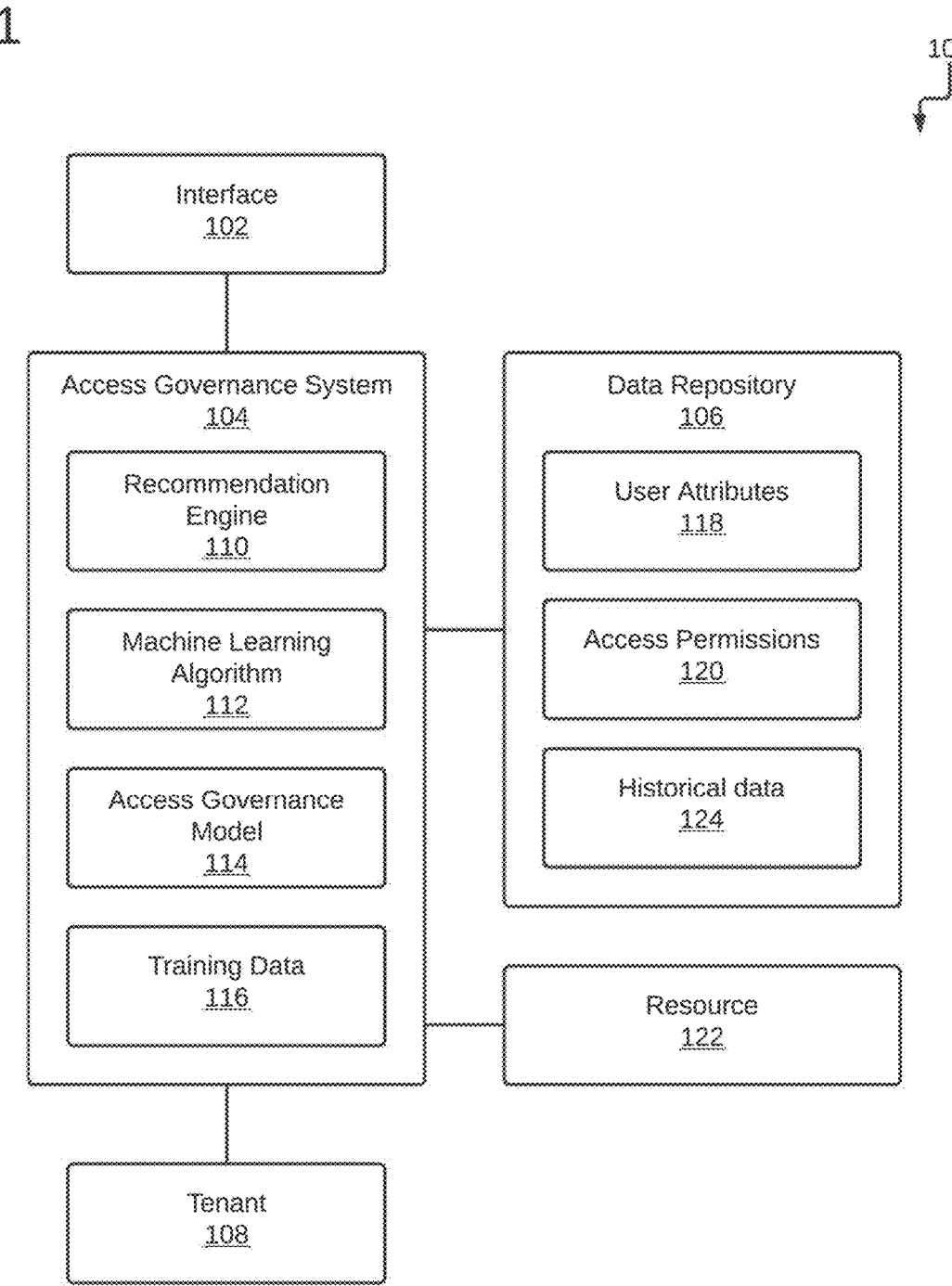
FIG. 1 illustrates a system in accordance with one or more embodiments.

FIG. 1 illustrates a system 100 in accordance with one or more embodiments. As illustrated in FIG. 1, system 100 includes an interface 102, an access governance system 104, a data repository 106, and one or more tenants 108. The access governance system 104 includes a recommendation engine 110, a machine learning algorithm 112, a target model 114, and training data 116. The data repository 106 includes user attributes 118 and access permissions 120. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in the section titled "Computer Networks and Cloud Networks."

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.1. Access Governance System

In one or more embodiments, access governance system 104 refers to hardware and/or software configured to perform operations described herein for access governance. Examples of operations for access governance are described below with reference to FIGS. 2A-2B.

Specifically, in an embodiment, access governance system 104 includes a recommendation engine 110 configured to generate recommendations regarding access permissions 120. Recommendation engine 110 is configured to use techniques described herein to generate recommendations. The recommendation engine 110 may use machine learning (e.g., machine learning algorithm 112) to generate recommendations. Recommendations may be based, at least in part, on user attributes 118 and existing access permissions 120. User attributes 118 and access permissions 120 are described in further detail below.

In an embodiment, access permissions 120 indicate which user(s) have access to one or more resources 122. A resource 122 is any data, service, application, etc. to which a user may have access. For example, a resource 122 may include one or more central processing units ("CPUs"), network ports, database connections, user sessions, memory, operating systems, application instances, virtual machine instances, documents, etc. In general, a resource 122 may be any component that is guarded by an access policy, such that a user attempting to access the resource 122 is required to have the appropriate access permission(s) 120 for access to be granted.

Access permissions 120 may be specific to an individual user and/or a group of users (e.g., all users having a particular user attribute 118 in common). Some resources 122 may be accessible only to a single user (e.g., a user's personal files), while other resources 122 may be accessible to multiple users (e.g., a helpdesk ticketing application that is accessible by all helpdesk staff). When a user attempts to access a resource 122, the system references the relevant access permissions 120 to determine if the user is authorized to access that resource 122.

More specifically, access permissions 120 may include a particular access permission 120 associated with a particular resource 122 (e.g., granting a specific user access to a specific resource 122), a set of access permissions 120 associated with a resource 122 (e.g., a list of users and/or user roles authorized to access a given resource 122), and/or a user role (i.e., a set of access permissions 120 that define a particular role, where that role may be assigned to multiple users). Access permissions 120 may indicate if particular users and/or user roles are authorized to perform specific actions with respect to a resource 122, such as reading data, writing data, and/or executing a particular function. Access permissions 120 may be more or less granular, depending on how they are configured.

In an embodiment, user attributes 118 refer to attributes that describe one or more users. Some user attributes 118 may be the same between different users, while other user attributes 118 may differ between different users. Some examples of user attributes 118 include, but are not limited to: job codes; locations; managers; organizations; departments; hiring dates; job roles; etc.

In an embodiment, historical data 124 includes information associated with recommendations and corresponding outcomes. Specifically, historical data 124 may include information about the nature of the recommendation (i.e., administrative approval or review), the user(s) targeted by the recommendation, and/or the user attributes 118 considered when generating the recommendation.

2.2. Machine Learning

In one or more embodiments, a machine learning algorithm 112 is an algorithm that can be iterated to train a target model f that best maps a set of input variables to an output variable. In particular, a machine learning algorithm 112 is configured to generate and/or train an access governance model 114. To train the access governance model 114, the machine learning algorithm 112 uses training data 116, which may include user attributes 118 and access permissions 120.

A machine learning algorithm is an algorithm that can be iterated to train a target model f that best maps a set of input variables to an output variable, using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm, which in turn updates the target model f.

A machine learning algorithm 112 generates a target model f such that the target model f best fits the datasets of training data to the labels of the training data. Additionally, or alternatively, a machine learning algorithm 112 generates a target model f such that when the target model f is applied to the datasets of the training data, a maximum number of results determined by the target model f matches the labels of the training data. Different target models be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

2.3. Interface

In one or more embodiments, interface 102 refers to hardware and/or software configured to facilitate communications between a user and one or more other components of the system 100 (e.g., access governance system 104). Interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 102 is specified in one or more other languages, such as Java, C, or C++.

2.4. Data Repository

In one or more embodiments, a data repository 106 is any type of storage unit and/or device (e.g., a file system, database, collection of tables, or any other storage mechanism) for storing data. Further, a data repository 106 may include multiple different storage units and/or devices. The multiple different storage units and/or devices may or may not be of the same type or located at the same physical site. Further, a data repository 106 may be implemented or executed on the same computing system as one or more other components of the system 100. Additionally, or alternatively, a data repository 106 may be implemented or executed on a computing system separate from one or more other components of the system 100. The data repository 106 may be communicatively coupled to one or more other components of the system 11 (e.g., access governance system 104) via a direct connection or via a network.

Information describing user attributes 118 and access permissions 120 may be implemented across any of components within the system 100. However, this information is illustrated within the data repository 106 for purposes of clarity and explanation.

2.5. Tenancies

In one or more embodiments, a tenant 108 is a corporation, organization, enterprise or other entity that accesses a shared computing resource, such as access governance system 104. In an embodiment, different tenants 108 are independent from each other. A business or operation of one tenant 108 is separate from a business or operation of another tenant 108.

3. ACCESS GOVERNANCE

Figure 2A:
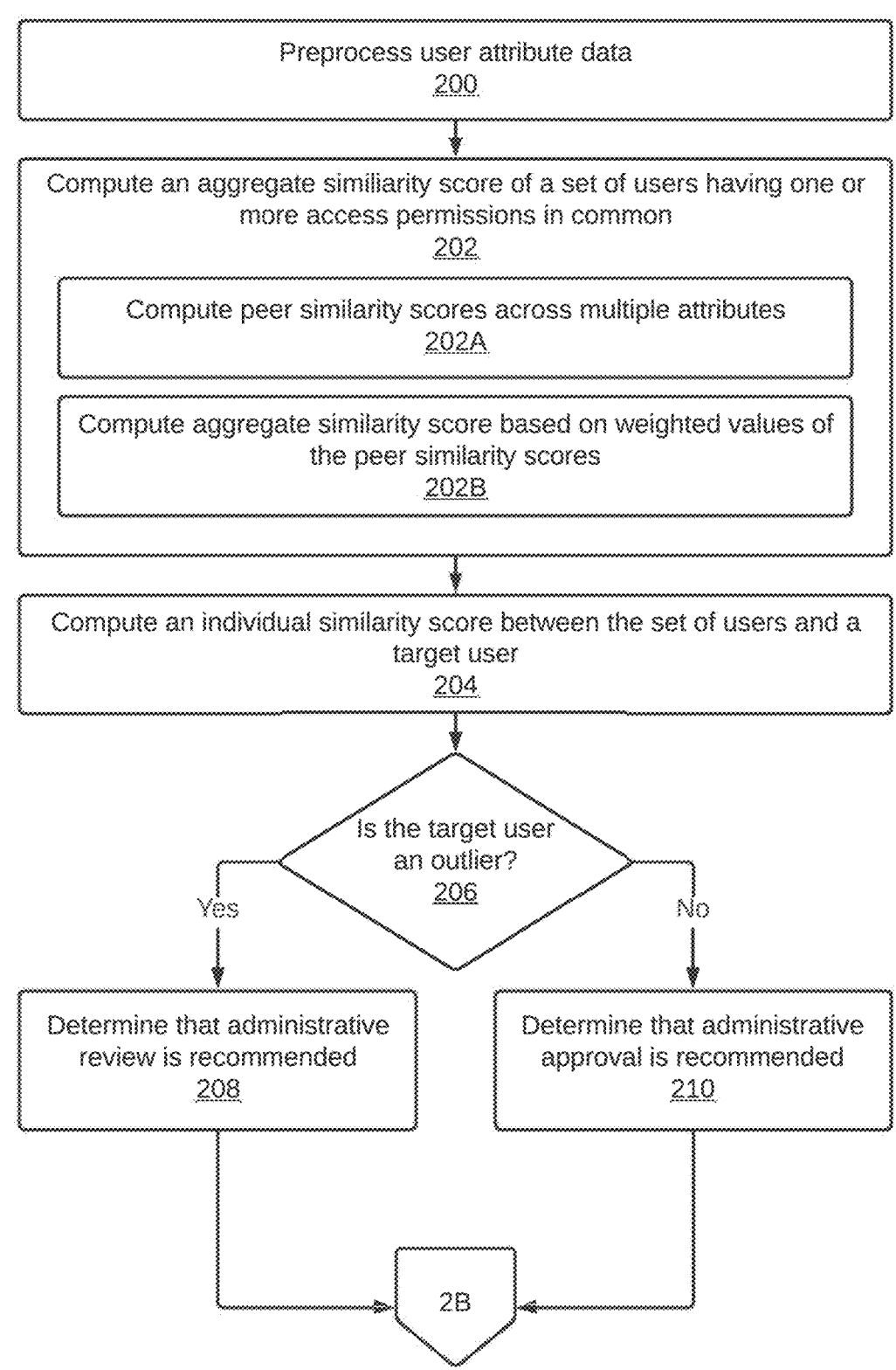
FIGS. 2A-2B illustrate an example set of operations for access governance in accordance with one or more embodiments.
Figure 2B:
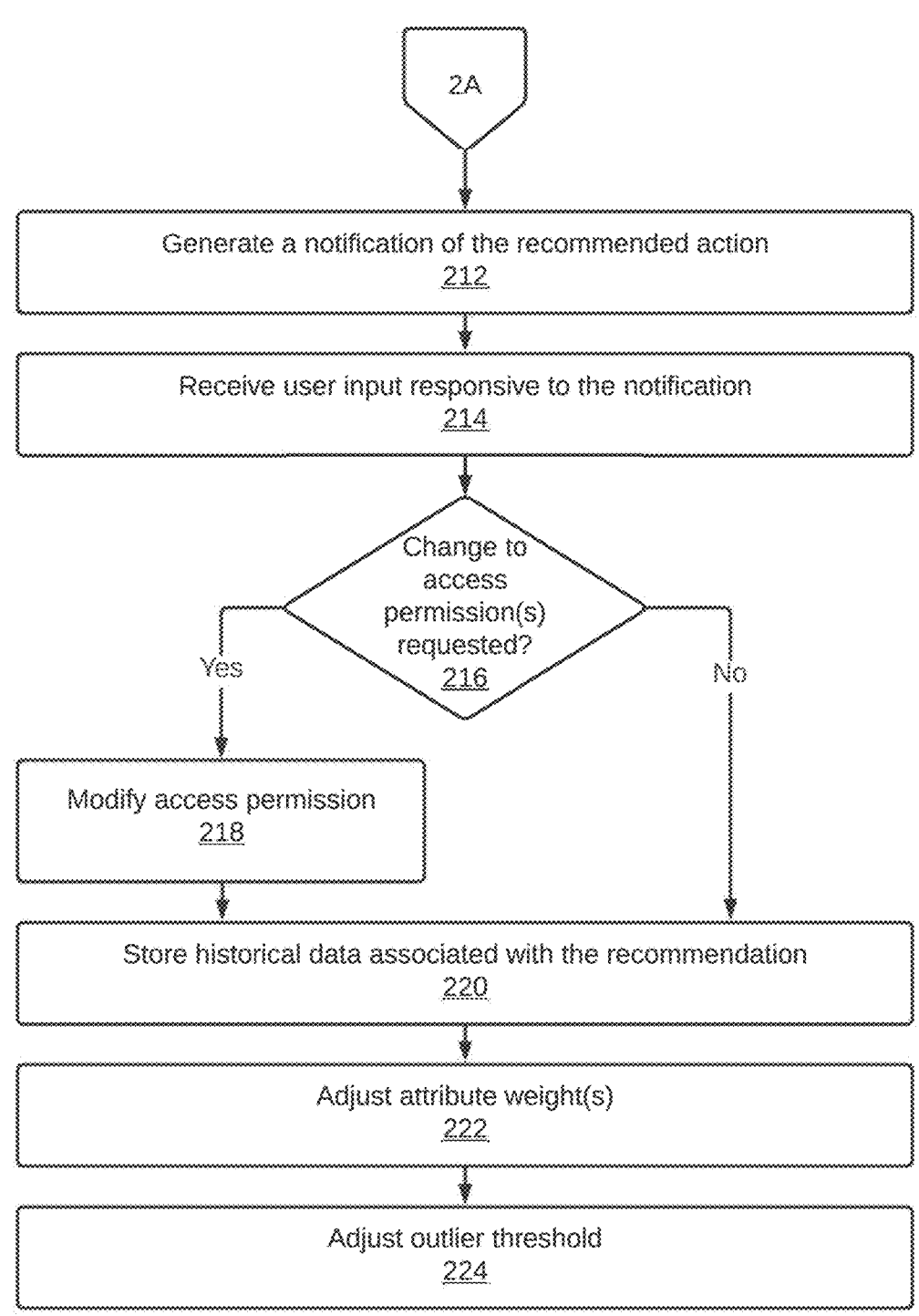

FIGS. 2A-2B illustrate an example set of operations for access governance in accordance with one or more embodiments. One or more operations illustrated in FIGS. 2A-2B may be modified, rearranged, or omitted. Accordingly, the particular sequence of operations illustrated in FIGS. 2A-2B should not be construed as limiting the scope of one or more embodiments.

In an embodiment, the system preprocesses user attribute data (Operation 200). Preprocessing the user attribute data transforms the data into a normalized format that is suitable for analysis. For example, a user attribute may represent the user's home office location as text (e.g., "North America", "Europe," "Asia," etc.). The system may transform the text data into numerical data (e.g., 1, 2, 3, etc.). The system may similarly convert text job titles (e.g., "Software Engineer," "Data Analyst," or "Project Manager") into numbers that continue to categorize users by job title but are more suitable for quantitative analysis and comparison of attributes. Similar text attributes (e.g., "Software Engineer" and "Software Developer") may be transformed to the same number, thus normalizing the data even when the text attributes are not strictly identical. In general, preprocessing the data facilitates grouping users by attributes for the purpose of determining similarities between users as described herein.

To preprocess the user attribute data, one or more embodiments parse the user attribute data, identify text-based attributes, and apply appropriate encoding techniques to convert the text-based attributes into numerical formats. For example, the system may use one-hot encoding, label encoding, ordinal encoding, and/or another encoding technique, depending on the nature of the attribute and the requirements of the similarity computation algorithm.

Alternatively or additionally, preprocessing the user attribute data may use encryption and/or anonymization techniques to help ensure user privacy and data security. For example, one or more embodiments may transform user attributes into encrypted formats, rendering them indecipherable to unauthorized entities. This cryptographic shielding safeguards user information during transmission and storage, mitigating the risk of unauthorized access or interception by malicious actors. Additionally, anonymization techniques can be employed to further enhance user privacy by screening out personally identifiable information from the dataset. For example, anonymization may remove or obfuscate direct identifiers such as names or email addresses, and replace them with unique identifiers or pseudonyms. Thus, even if the data were to be compromised, the identities and sensitive attributes of individual users would remain concealed.

In an embodiment, the system computes an aggregate similarity score of a set of users having one or more access permissions in common (Operation 202). As discussed in further detail below, the system may generate the aggregate similarity score based on comparisons between users and their peers that have one or more attributes in common. The resulting aggregate similarity score represents an overall similarity of the users to each other.

In an embodiment, to compute an aggregate similarity score, the system computes peer similarity scores across multiple attributes (Operation 202A). Specifically, the system identifies sets of users having one or more particular attributes in common. Users may be grouped based on having a single attribute in common (e.g., job code) or multiple attributes in common (e.g., department and job code). For pairs of users within a set, the system computes pairwise similarity scores that represent similarities of pairs of users to each other. As noted above, the system computes the peer similarity scores across multiple sets of attributes. For example, the system may compute peer similarity scores for peers grouped by manager, job code, location, and organization.

The system may compute the aggregate similarity score based on weighted values of the peer similarity scores (Operation 202B). Specifically, the system may apply weights associated with different attributes to the corresponding peer similarity scores, so different attributes do not contribute in equal proportion to the aggregate similarity score. Because peer similarity scores are computed for users grouped by shared attributes, the weights may represent the importance or relevance of each attribute to access governance. In one example, job code may be weighted more heavily than location when determining whether a user should have access to a sensitive resource. In another example, a resource is associated with a sovereignty requirement that permits access by users only in specific geographic locations; in this case, location may be weighted more heavily than job code.

In a system that services multiple organizations (e.g., a multi-tenant cloud environment), different organizations may assign different weights to the same attributes, so access governance can be tailored to each organization's specific needs and priorities. Alternatively, the same set of weights may apply to multiple organizations. The weights may be user-assigned, for example, by a systems administrator. Alternatively or additionally, the system may be configured to adjust weights applied to different attributes, without user input, based on feedback regarding the accuracy of recommendations generated by the system. The system may initially apply default weights to the attributes and adjust the weights over time. The initial weights may be predetermined based, for example, on organizational policies, access control requirements, and/or historical data insights. By adjusting weights responsive to feedback, the system may continue to "learn" and improve its accuracy in generating recommendations over time.

In an embodiment, the system computes an individual similarity score between the set of users and a target user (Operation 204). The target user may be a user that already has a particular access permission that is potentially subject to review, or a user that is requesting a particular access permission that may or may not be appropriate for that user.

In an embodiment, to compute an individual similarity score between the set of users and the target user, the system computes similarity scores between the target user and the peer group across the relevant attributes. The system then averages those similarity scores to obtain a single metric that represents the target user's overall similarity to the peer group. Some examples of computing individual similarity scores are described below.

Based on the individual similarity score and the aggregate similarity score, the system determines if the target user is an outlier (Operation 206). To determine if the target user is an outlier, the system may compare the user's individual similarity score (computed as described with respect to Operation 204) to the aggregate similarity score. The comparison may be based on an absolute difference and/or a relative difference (e.g., a ratio of the individual similarity score to the aggregate similarity score, or vice versa). The target user is an outlier if the difference fails to satisfy a threshold condition, such as whether the difference meets or exceeds a threshold amount.

If the target user is an outlier, then the system determines that administrative review is recommended (Operation 208). The fact that the target user is an outlier indicates that the user is sufficiently different from peers having the same access permission that administrative review is warranted to determine if the target user should continue to have that access permission (if the user already has the access permission) or should be granted the access permission (if the user is requesting the access permission).

If the target user is not an outlier, then the system determines that administrative approval is recommended (Operation 210). The fact that the target user is not an outlier indicates that the user is sufficiently similar to peers having the same access permission that administrative approval is recommended. Specifically, administrative approval is recommended to confirm that the target user should continue to have that access permission (if the user already has the access permission) or should be granted the access permission (if the user is requesting the access permission).

In an embodiment, the system generates a notification of the recommended action (Operation 212). Specifically, the notification indicates if administrative review, administrative approval, and/or some other action is recommended with respect to the access permission(s) in question. To generate the notification, the system may transmit the notification to a user (e.g., a systems administrator or other user responsible for managing access permissions) by email, text message, and/or some other form of direct communication. Alternatively or additionally, the system may generate a user interface (e.g., the user interface of FIG. 1) that includes a notification of the recommendation. The user interface may also include other information relating to access governance. Some examples of such information are described below.

In an embodiment, the notification includes an explanation of the recommended action. Specifically, the explanation indicates one or more factors that contributed to the recommendation, i.e., one or more weighted attributes that, either individually or in combination, contributed the most to the user being classified as an outlier or not an outlier. The explanation may include text and/or some other visual representation of the most salient factor(s). For example, if the recommendation is for administrative review of an access permission, the explanation may indicate the factor(s) that contributed the most to the user being classified as an outlier. If the recommendation is for administrative approval of an access permission, the explanation may indicate the factor(s) that contributed the most to the user's individual similarity score being in alignment with the aggregate similarity score. The text may include a representation (e.g., numerical values and/or some other representation) of the weight(s) assigned to the most salient factor(s). If multiple factors are to be presented, the factors may be sorted in order of salience. For example, the factors may be sorted in ascending or descending order based on the weighted values contributed by the respective attributes to the user's individual similarity score. An explanation of the recommended action provides insight into the recommendation process, which may help a user viewing the recommendation to determine how to act upon the recommendation.

In an embodiment, the system receives user input responsive to the notification (Operation 214). For an access permission being evaluated, the user input may include an instruction to either change the access permission or leave the access permission as-is. For example, if the recommended action is administrative review or approval of an existing access permission, the user input may include an instruction to revoke the existing access permission or leave the existing access permission as-is. If the recommended action is an administrative review or approval of a requested access permission, the user input may include an instruction to approve the requested access permission or deny the requested access permission.

Based at least in part on the user input, the system may modify an access permission (Operation 218). Specifically, depending on the user input, the system may grant a requested access permission or revoke an existing access permission. The system may modify multiple access permissions. For example, the system may modify the same access permission for multiple users (e.g., multiple users recommended for review or approval of the same access permission) and/or multiple access permissions for the same user.

In an embodiment, the system stores a history of recommended actions and corresponding outcomes (Operation 220). Specifically, the system may store information about the nature of the recommendation (i.e., administrative approval or review), the user(s) targeted by the recommendation, and/or the attributes considered when generating the recommendation. As discussed below, the system may use the history to identify patterns in the outcomes and adjust the recommendation process accordingly.

In an embodiment, the system adjusts the weight(s) assigned to one or more attributes (Operation 222). The adjustment may be based on the user input and/or historical data. Adjusting the weight(s) allows the system to adapt and refine its decision-making process over time. For example, if users consistently agree with recommendations for users having a particular attribute in common, those approvals may suggest that the particular attribute correlates strongly with the outcome. Accordingly, the system may increase the weight assigned to that attribute, to reflect the significance of that attribute in the decision-making process. Alternatively, if users consistently disagree with recommendations for users having a particular attribute in common, the system may decrease the weight assigned to that attribute, so the attribute has less of an influence on future recommendations.

In an embodiment, the system adjusts the threshold value used to determine if a user is an outlier (Operation 224). The adjustment may be based on the user input and/or historical data. Adjusting the threshold allows the system to adapt and refine its decision-making process over time. In one example, recommendations to review access permissions consistently result in no action being taken. Specifically, existing access permissions are left as-is even when administrative review is recommended, and/or requested access permissions are approved even when administrative review is recommended. In this example, the system may determine that users are being categorized as outliers too aggressively. Accordingly, the system may increase the threshold value so in the future, users are less likely to be categorized as outliers.

In the description above, certain actions may be performed responsive to user input. Alternatively or additionally, the system may be configured to perform such actions without requiring user input. In one example, a target user requests a particular access permission. Using techniques described above, the system determines that the target user is an outlier with respect to the requested access permission. In this example, the system maintains two threshold values: one for classifying the target user as an outlier, and another for instances where the target user is so much of an outlier that the system can take action without first requiring administrative review. If the difference between the target user's individual similarity score and the aggregate similarity score is sufficiently large to satisfy the second threshold condition, the system may reject the requested access permission without first requiring administrative review. In another example, the system determines that a target user is an outlier with respect to an access permission that the target user already holds. If the difference between the target user's individual similarity score and the aggregate similarity score is sufficiently large (e.g., the difference satisfies a second threshold condition as described above), the system revokes the existing access permission without first requiring administrative review.

Alternatively or additionally, the system may maintain a separate threshold value for classifying the target user as highly similar to other users. In one example, a target user requests a particular access permission. The system determines that the target user's individual similarity score is sufficiently similar to the aggregate similarity score (i.e., the difference is within the threshold percentage or amount) that administrative review or approval is not required to grant the requested access permission. In this example, the system grants the requested access permission without first requiring administrative review or approval.

Thus, the system can proactively manage access permissions without requiring intervening user input in at least some cases. Proactive management can further improve system performance by reducing the amount of time during which a target user has the wrong access permission(s). As one example, the system may proactively remove an inappropriate access permission, thus reducing the amount of time sensitive data is exposed to the wrong user(s). As another example, the system may proactively grant a requested access permission, thus reducing the amount of time needed to make the relevant resource(s) available to the target user(s). In general, a system functions better when resources (a) are not accessible to users who should not have access and (b) are accessible to users who should have access.

4. EXAMPLE EMBODIMENTS

Detailed examples are described below for purposes of clarity. Components and/or operations described below should be understood as specific examples that may not be applicable to certain embodiments. Accordingly, components and/or operations described below should not be construed as limiting the scope of any of the claims.

4.1. Preprocessing

Figure 3:
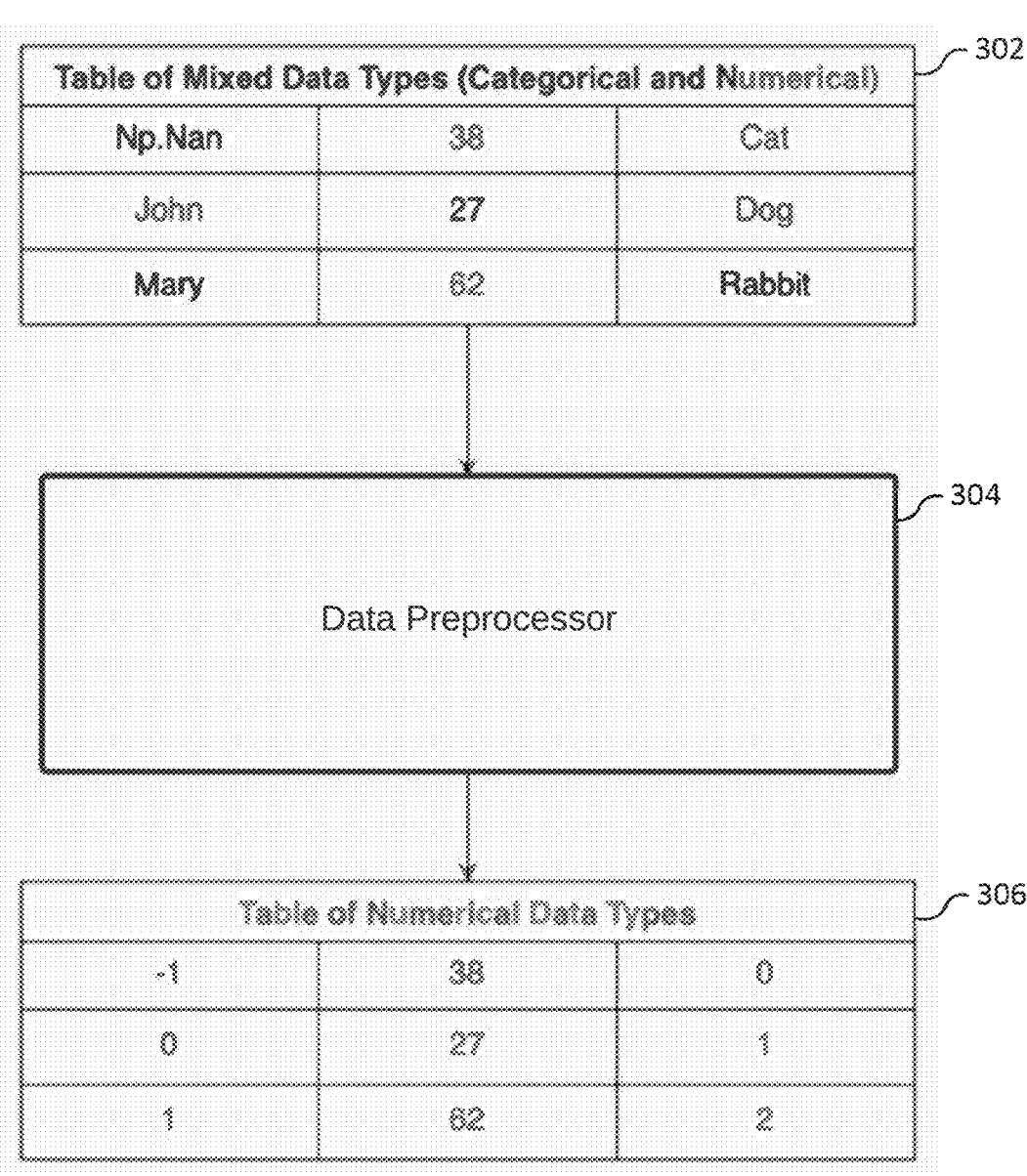
FIG. 3 illustrates an example of preprocessing data in accordance with one or more embodiments.

FIG. 3 illustrates an example of preprocessing data in accordance with one or more embodiments. In this example, table 302 includes sample data in three columns. The data is of mixed data types: the first column includes names represented as strings; the second column includes numerical data; and the third column includes categorical data represented as text ("Cat," "Dog," and "Rabbit"). A data preprocessor 304 is configured to preprocess the data, so all the data is in numerical format. Table 306 shows the same data after preprocessing. Specifically, in table 306, the names have been anonymized to unique numbers (−1, 0, and 1, respectively), the numerical data in the second column is unchanged, and the text categories have been replaced with corresponding unique numerical values (0, 1, and 2, respectively).

4.2. Identifying Outliers

Figure 4:
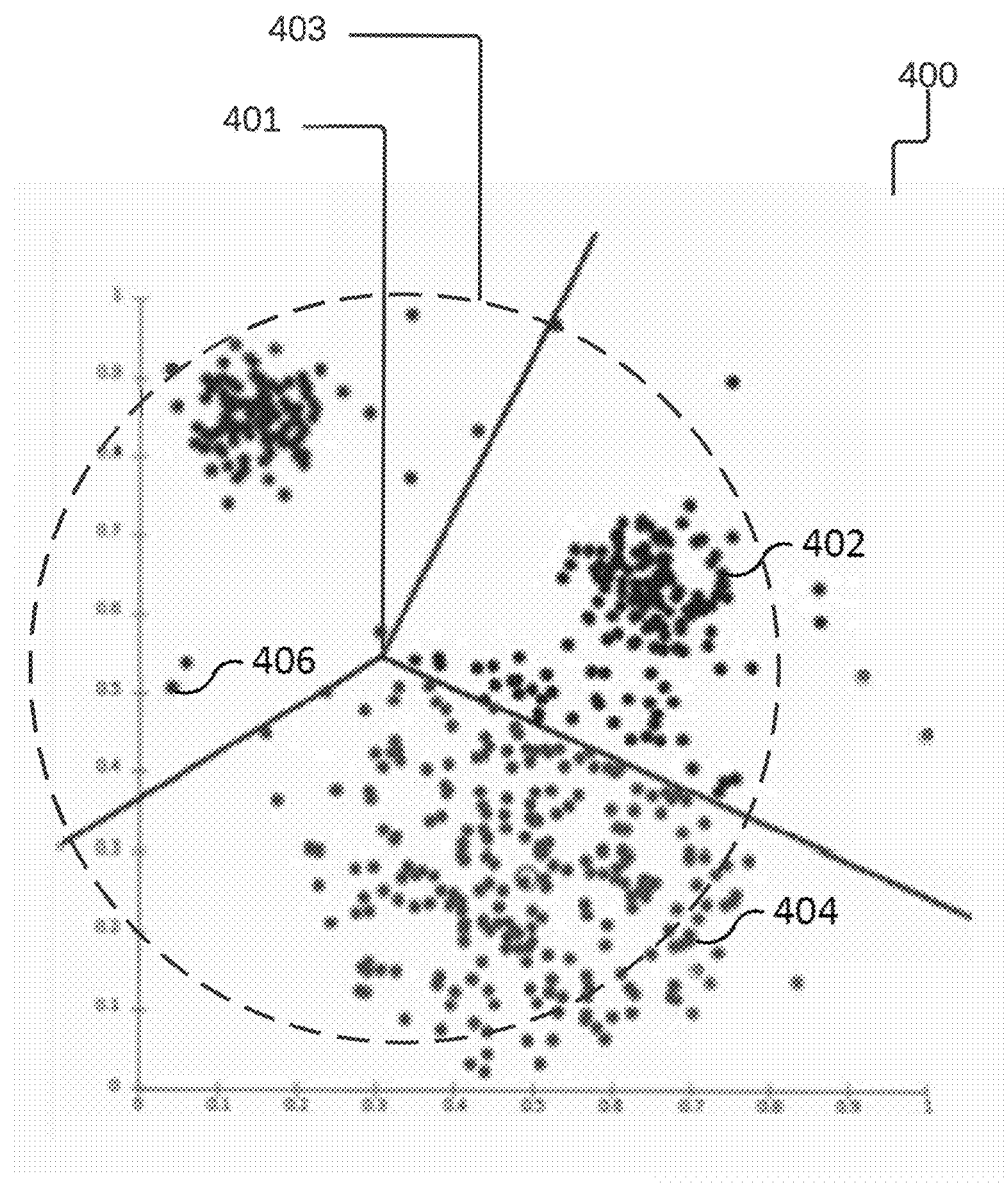
FIG. 4 illustrates an example of classifying users as inliers or outliers in accordance with one or more embodiments.

FIG. 4 illustrates an example of classifying users as inliers or outliers in accordance with one or more embodiments.

Specifically, FIG. 4 illustrates an example of a scatter plot 400 that shows users classified as inliers or outliers. Each axis represents similarity with respect to a particular attribute. In this example, there are two dimensions, but one or more embodiments may use any number of dimensions. Point 401 is the intersection of the aggregate similarity scores across each dimension. Data points in the scatter plot 400 correspond to individual user's similarity scores across the same dimensions. The dashed line 403 represents the threshold for determining if a user is an outlier. Specifically, if a target user's data point falls inside the dashed line (for example, points 402 and 406), then the target user is an inlier; however, if the target user's data point falls outside the dashed line 403 (for example, point 404), then the target user is an outlier.

In this example, the dashed line 403 forms a circle because the model is 2-dimensional. In a model having N dimensions, the dashed line 403 will form a theoretical N-dimensional shape that defines the boundary between inliers and outliers. This theoretical shape may not be a regular shape in the geometric sense of the term "regular." For example, if the system maintains different threshold values for different attributes, the theoretical shape bounded by those values will not be a regular shape.

4.3. Computing Similarity Scores

Figure 5:
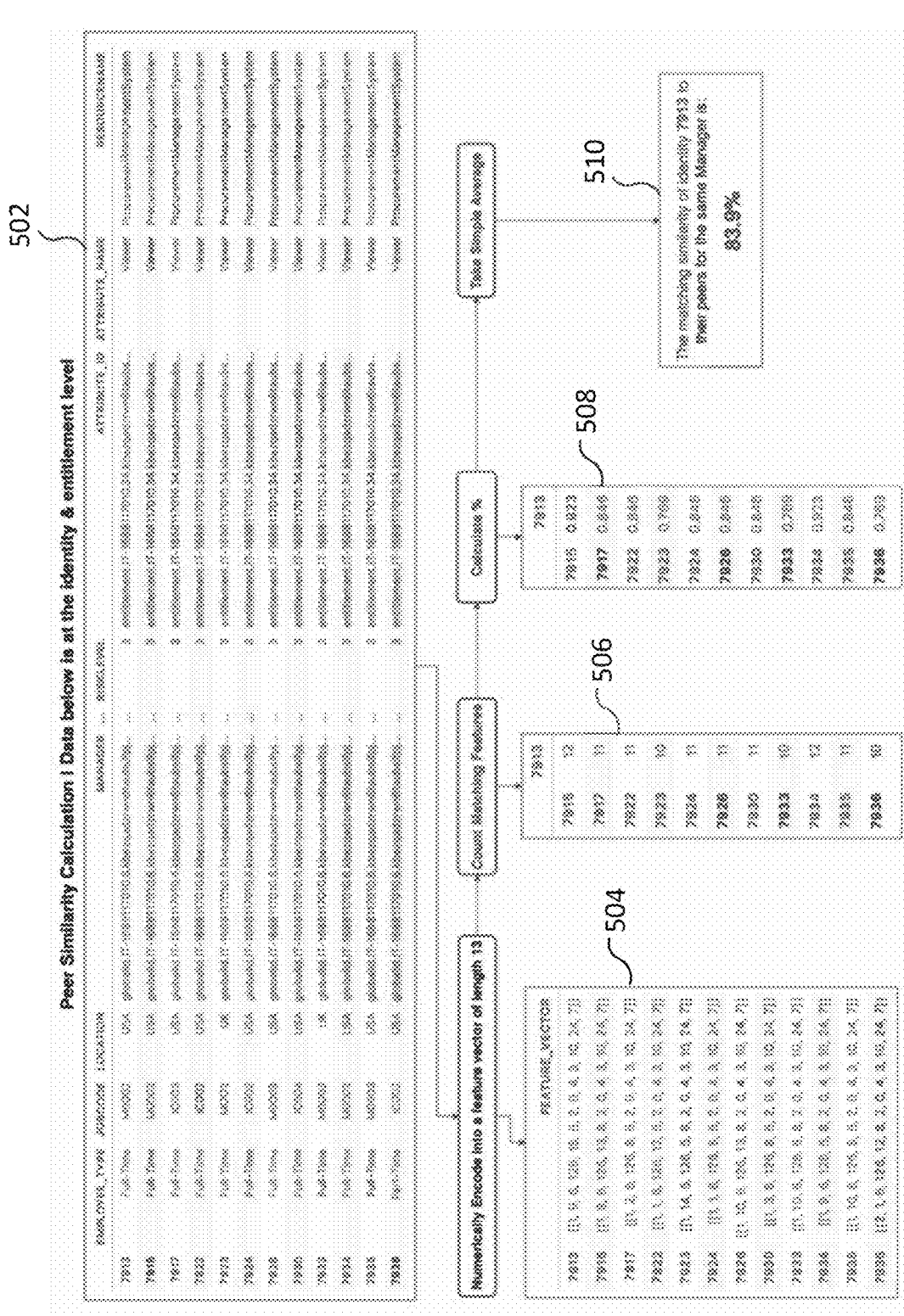
FIG. 5 illustrates an example of computing a user's individual similarity score in accordance with one or more embodiments.

FIG. 5 illustrates an example of computing a user's individual similarity score in accordance with one or more embodiments. In FIG. 5, table 502 organizes information about multiple users at the identity and entitlement level. Specifically, table 502 represents a set of users having the same manager (an identity-related attribute) and the same access permission (an entitlement-related attribute) with respect to a particular resource (shown in the last column of table 502).

The system encodes the data from table 502 into feature vectors 504 of length 13, reflecting 13 attributes that factor into the similarity analysis. Specifically, the feature vectors 504 include numerical representations of the users' respective attributes. As discussed above, the system may apply weights to each of the attributes.

Table 506 represents the number of features (i.e., vector features corresponding to different attributes) that match between a target user (in this example, employee 7913) and the other users in the group. For example, the target user has 12 of the 13 features that match with employee 7915. Table 508 represents the percentage similarity between the target user and the other users in the group. To compute the target user's individual similarity score, the system takes the average of the percentages in table 508. The resulting percentage is a metric that quantifies the target user's overall similarity to the other users in the group.

4.4. Feature Engineering

FIG. 6 illustrates an example of feature engineering in accordance with one or more embodiments. Specifically, FIG. 6 illustrates an example list of features 602 that the system may use to identify outliers. The system derives these features 602 from original user data and uses the features 602 to group users into peer groups, calculate similarity scores, classify users as inliers or outliers, and generate recommendations. One or more of the features 602 may be engineered, i.e., generated by the system as a function of one or more other features.

In an embodiment, the features 602 include peer similarity features that quantify the similarity between a user and their peers. For example, MANAGER_LOC_PEER_SIM represents the similarity between a user's attributes and the attributes of other users who share the same manager and location. JOBCODE_PEER_SIM represents the similarity between a user and others who have the same job code. ORG_LOC_PEER_SIM represents the similarity between a user and others who belong to the same organization and share the same work location.

In an embodiment, the features 602 include features that quantify the number of users having one or more particular attributes in common. For example, NUM_PEERS_BY_MANAGER counts the total number of users who report to the same manager as the target user. NUM_PEERS_BY_JOBCODE counts the number of users who share the same job code as the target user. NUM_PEERS_BY_LOC counts the total number of users who share the same work location as the target user.

In the example illustrated in FIG. 6, some of the feature names include the suffix "IGA." This suffix indicates that a feature represents an intra-group average. The system computes the values of features 602 with this suffix relative to the average similarity within the group of users being evaluated (e.g., users grouped by manager, job code, etc.).

4.5. Classifications

Figure 7A:
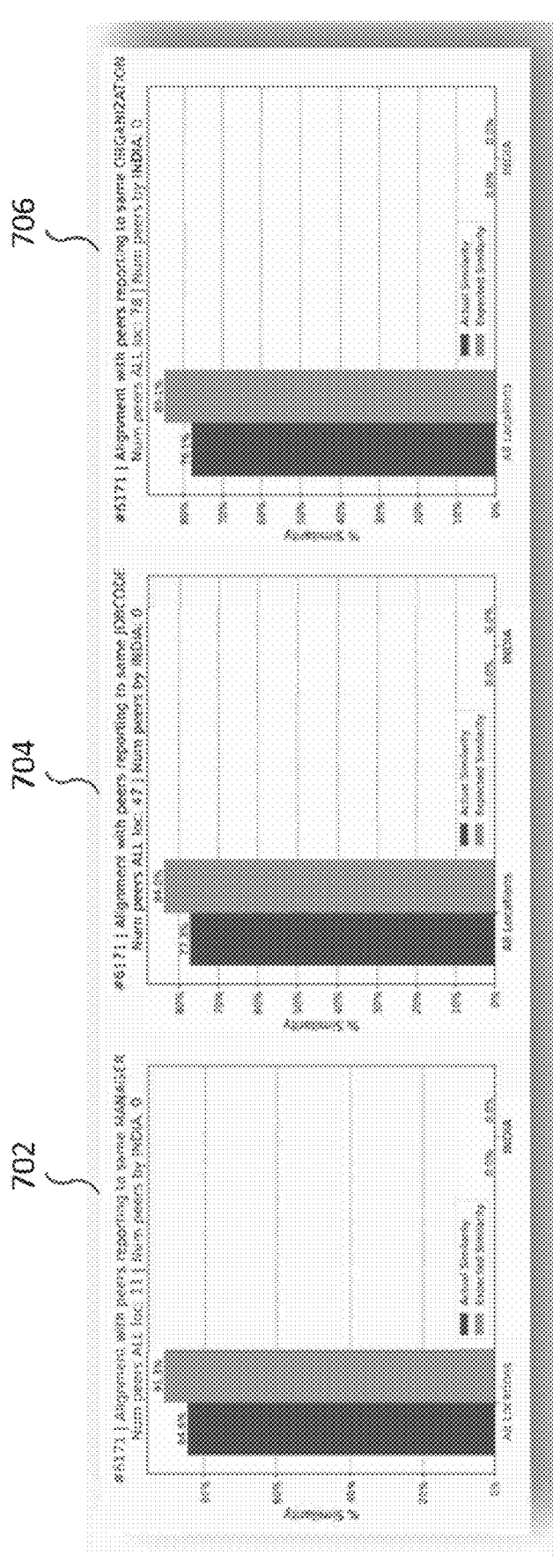
FIGS. 7A-7B illustrate examples of classifications in accordance with one or more embodiments.
Figure 7B:
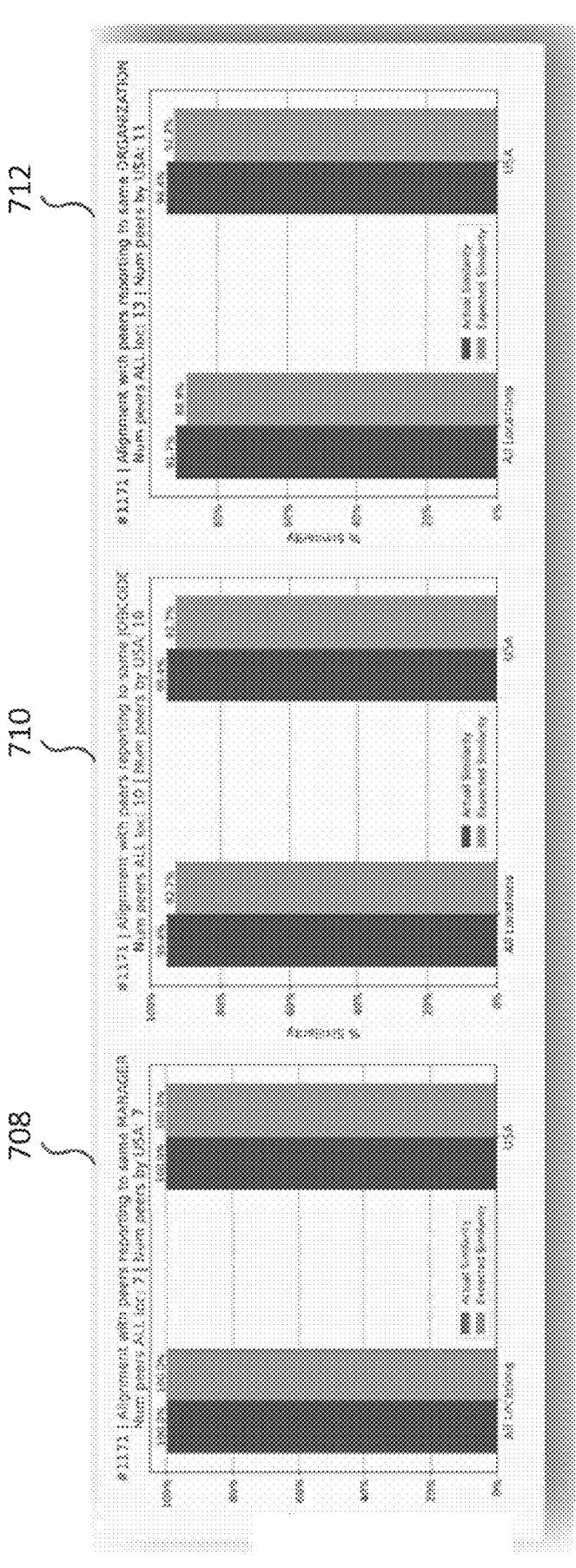

FIGS. 7A-7B illustrate examples of classifications in accordance with one or more embodiments. Specifically, FIG. 7A illustrates examples of bar charts 702, 704, and 706 that explain user classifications in accordance with one or more embodiments. The system generates the text that accompanies the bar charts 702, 704, and 706 to explain the classifications. The bars in the bar charts 702, 704, and 706 compare different features or attributes of a target user with those of a reference group. In the bar charts 702, 704, and 706, the y-axis represents the value or magnitude of each feature. For example, the height of a bar may represent the number of peers having a job code or other feature in common.

In this example, bar chart 702 compares a target user (employee number 6171) with peers who report to the same manager. Here, "expected similarity" corresponds to the aggregate similarity score for the group of peers. Similarly, bar chart 704 compares the target user with peers having the same job code. Bar chart 706 compares the target user with peers in the same organization. Bar charts 702, 704, and 706 further attempt to show a sub-comparison of the target user with peers located in the same country (in this example, India); however, no matching peers are found.

FIG. 7B illustrates examples of bar charts 708, 710, and 712 that explain user classifications in accordance with one or more embodiments. Similar to bar chart 702 of FIG. 7A, bar chart 708 compares a target user (employee number 1171) with peers who report to the same manager. Similar to bar chart 704 of FIG. 7A, bar chart 710 compares the target user with peers having the same job code. Similar to bar chart 706 of FIG. 7A, bar chart 712 compares the target user with peers in the same organization. Bar charts 702, 704, and 706 further show a sub-comparison of the target user with peers located in the same country (the United States). In this example, all the peers reporting to the same manager are in the same country; all the peers with the same job code are in the same country; and all but two of the peers in the same organization are in the same country.

In an embodiment, bar charts and/or text explanations such as those shown in FIGS. 7A and 7B may be presented to a user along with a recommended action. The bar charts provide a convenient visual representation of the target user's similarity to peers in the different groups, which may inform a user's decision about how to act on the recommendation.

4.6. Explanations of Recommendations

Figure 8A:
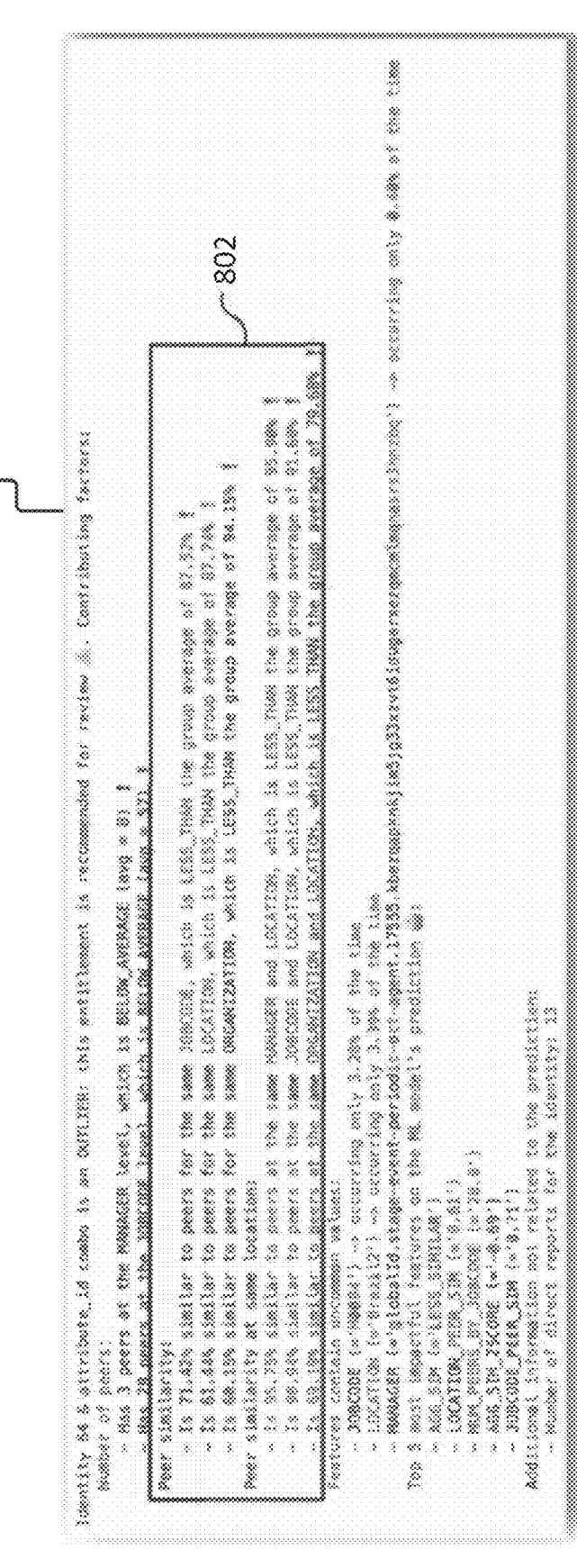
FIGS. 8A-8B illustrate examples of explanations of classifications in accordance with one or more embodiments.
Figure 8B:
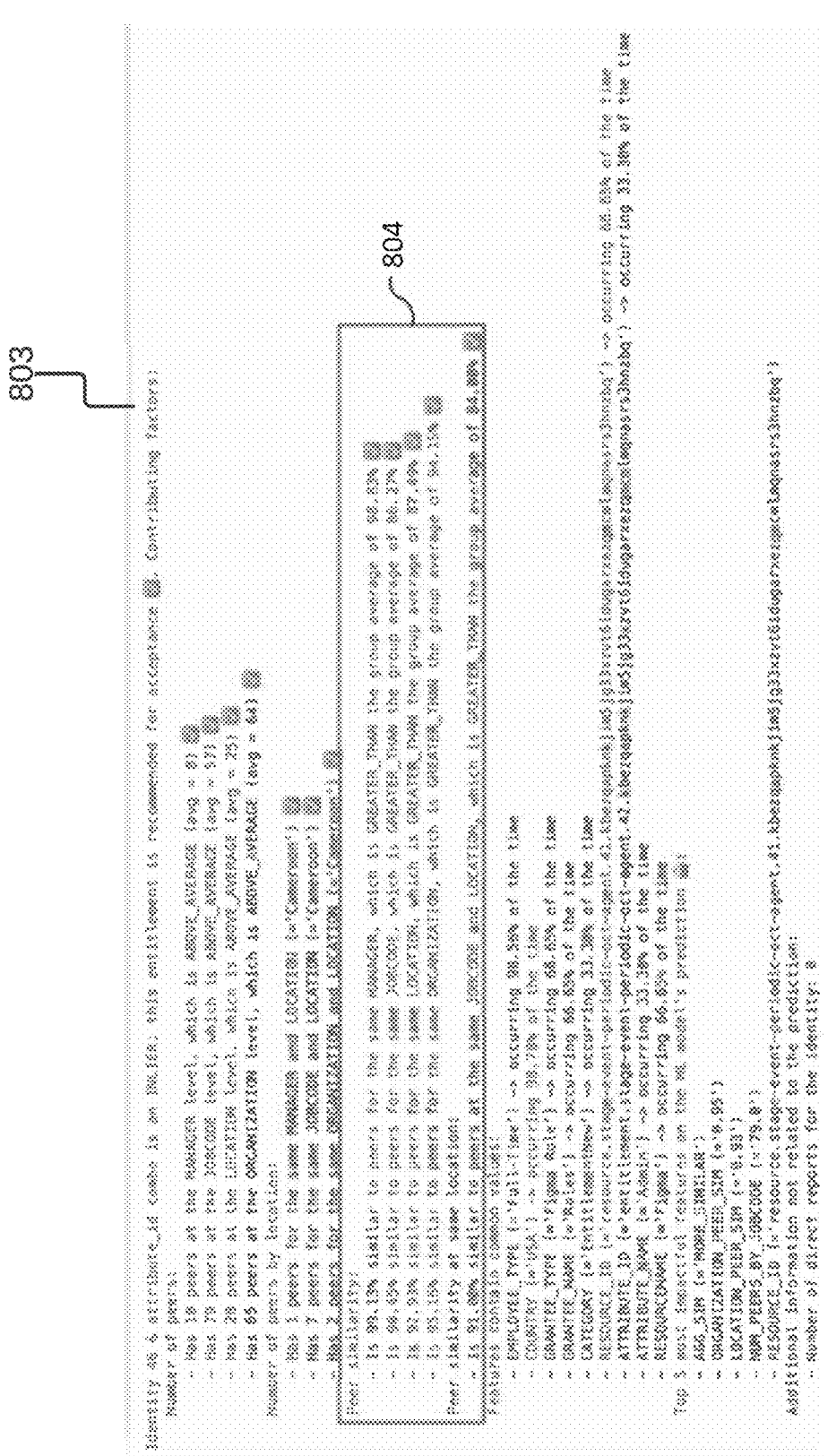

FIGS. 8A-8B illustrate examples of explanations of classifications in accordance with one or more embodiments. Specifically, FIG. 8A illustrates an example of a textual explanation 801, generated by the system, that explains a target user's classification as an outlier. The first line of explanation 801 indicates that the target user is an outlier and recommends the entitlement (i.e., the target user's access permission with respect to a specific resource) for administrative review. Explanation 801 further includes an explanation 802 of factors that contributed to the recommendation. In this example, relevant factors include the target user's similarity to their peers with respect to job code, location, organization, the combination of manager and location, the combination of job code and location, and the combination of organization and location. The exclamation marks seen in FIG. 8A indicate that for a given feature, the target user is an outlier. Thus, explanation 801 provides visual context in a format that is readily understandable by a human who receives the recommendation to understand how the system arrived at the recommendation.

FIG. 8B illustrates an example of a textual explanation 803, generated by the system, that explains a target user's classification as an inlier. The first line of explanation 803 indicates that the target user is an inlier and recommends the entitlement for administrative acceptance (i.e., approval). Explanation 803 further includes an explanation 804 of factors that contributed to the recommendation. In this example, relevant factors include the target user's similarity to their peers with respect to manager, job code, location, organization, and the combination of job code and location. The check marks seen in FIG. 8B indicate that for a given feature, the target user is an inlier. Thus, explanation 803 provides visual context in a format that is readily understandable by a human who receives the recommendation to understand how the system arrived at the recommendation.

5. PRACTICAL APPLICATIONS, ADVANTAGES & IMPROVEMENTS

One or more embodiments provide an improvement in the technical field of access governance. Specifically, one or more embodiments improve the functioning of a computer system by helping to ensure that users have the correct access permissions. Ensuring that users have the correct access permissions improves system security and integrity, by protecting resources from access by users who should not be authorized to access those resources. Ensuring that users have the correct access permissions further improves the functioning of a computer system by ensuring that the appropriate users have access to utilize resources as intended. Thus, one or more embodiments improve the security, integrity, and proper functioning of the computer system.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
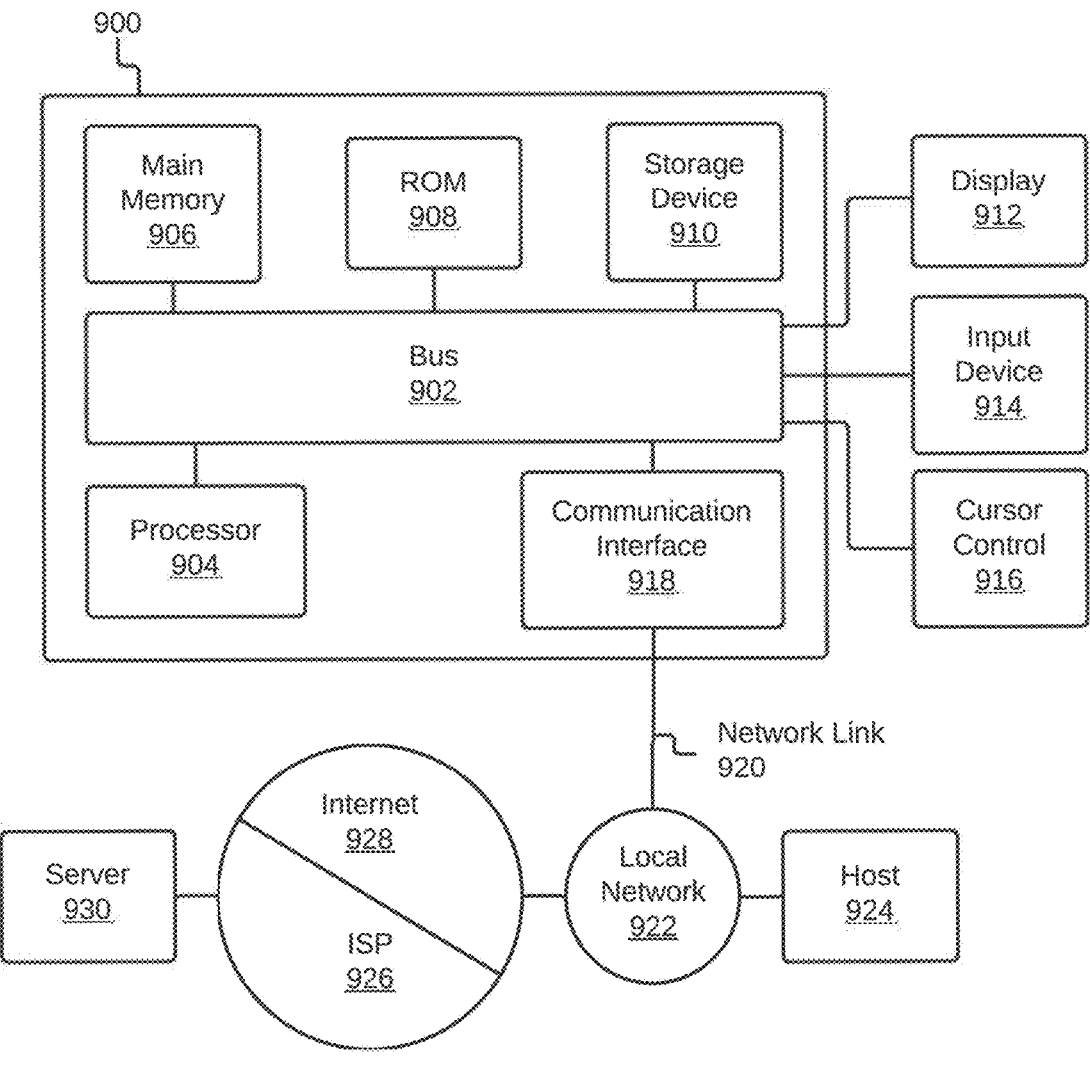
FIG. 9 shows a block diagram that illustrates a computer system in accordance with one or more embodiments.

For example, FIG. 9 is a block diagram that illustrates a computer system 900 upon which an embodiment of the disclosure may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or a Solid State Drive (SSD) is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

8. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media storing instructions that, when executed by one or more hardware processors, cause performance of operations comprising:

computing, based on a plurality of attributes associated with a plurality of users having one or more access permissions in common, an aggregate similarity score of the plurality of users;

computing, based at least on the plurality of attributes, an individual similarity score between the plurality of users and a target user, wherein the target user has the one or more access permissions or the target user requests to have the one or more access permissions;

determining, based at least on the individual similarity score and the aggregate similarity score, a recommended action with respect to the one or more access permissions for the target user, wherein the recommended action comprises one of (a) administrative review or (b) administrative approval of the one or more access permissions for the target user; and generating a notification of the recommended action with respect to the one or more access permissions for the target user.

2. The one or more non-transitory computer-readable media of claim 1, wherein computing the individual similarity score between the plurality of users and the target user comprises classifying the target user as one of an outlier or an inlier with respect to the plurality of users.

3. The one or more non-transitory computer-readable media of claim 1, the operations further comprising:

determining one or more factors that contributed to determining the recommended action;

wherein determining the one or more factors comprises analyzing the weighted values for the plurality of attributes.

4. The one or more non-transitory computer-readable media of claim 3, wherein the notification comprises an explanation of the recommended action based on the one or more factors that contributed to determining the recommended action.

5. The one or more non-transitory computer-readable media of claim 1, wherein computing the aggregate similarity score of the plurality of users comprises:

computing respective peer similarity scores for a plurality of groupings of the plurality of users across the plurality of attributes; and computing the aggregate similarity score as a function of weighted values of the respective peer similarity scores.

6. The one or more non-transitory computer-readable media of claim 5, the operations further comprising:

determining the plurality of groupings of the plurality of users across the plurality of attributes, at least by:

identifying subsets of the plurality of users having respective attributes from the plurality of attributes in common; and assigning the subsets of the plurality of users to corresponding groupings in the plurality of groupings.

7. The one or more non-transitory computer-readable media of claim 5, the operations further comprising:

determining an initial set of respective values of weights used to compute the weighted values of the respective peer similarity scores; and based at least on an outcome of the recommended action, adjusting one or more of the respective values of the weights.

8. The one or more non-transitory computer-readable media of claim 1, wherein the one or more access permissions comprise one or more of: a particular access permission associated with an application; a set of a plurality of access permissions associated with the application; or a user role.

9. The one or more non-transitory computer-readable media of claim 1, the operations further comprising:

before computing the aggregate similarity score of the plurality of users, preprocessing the plurality of attributes at least by transforming a particular attribute in the plurality of attributes from text data to numerical data corresponding to categories for the particular attribute.

10. The one or more non-transitory computer-readable media of claim 1, wherein:

the recommended action comprises administrative review of the one or more access permissions for the target user; and determining the recommended action comprises determining that the individual similarity score differs from the aggregate similarity score by at least a threshold amount.

11. A method comprising:

computing, based on a plurality of attributes associated with a plurality of users having one or more access permissions in common, an aggregate similarity score of the plurality of users;

computing, based at least on the plurality of attributes, an individual similarity score between the plurality of users and a target user, wherein the target user has the one or more access permissions or the target user requests to have the one or more access permissions;

determining, based on the individual similarity score and the aggregate similarity score, a recommended action with respect to the one or more access permissions for the target user, wherein the recommended action comprises one of (a) administrative review or (b) administrative approval of the one or more access permissions for the target user; and generating a notification of the recommended action with respect to the one or more access permissions for the target user;

wherein the method is performed by at least one device including a hardware processor.

12. The method of claim 11, wherein computing the individual similarity score between the plurality of users and the target user comprises classifying the target user as one of an outlier or an inlier with respect to the plurality of users.

13. The method of claim 11, further comprising:

determining one or more factors that contributed to determining the recommended action;

wherein determining the one or more factors comprises analyzing the weighted values for the plurality of attributes.

14. The method of claim 11, wherein computing the aggregate similarity score of the plurality of users comprises:

computing respective peer similarity scores for a plurality of groupings of the plurality of users across the plurality of attributes; and computing the aggregate similarity score as a function of weighted values of the respective peer similarity scores.

15. The method of claim 11, wherein the one or more access permissions comprise one or more of: a particular access permission associated with an application; a set of a plurality of access permissions associated with the application; or a user role.

16. A system comprising:

one or more hardware processors;

one or more non-transitory computer-readable media; and program instructions stored on the one or more non-transitory computer readable media that, when executed by the one or more hardware processors, cause the system to perform operations comprising:

computing, based on a plurality of attributes associated with a plurality of users having one or more access permissions in common, an aggregate similarity score of the plurality of users;

computing, based at least on the plurality of attributes, an individual similarity score between the plurality of users and a target user, wherein the target user has the one or more access permissions or the target user requests to have the one or more access permissions;

determining, based on the individual similarity score and the aggregate similarity score, a recommended action with respect to the one or more access permissions for the target user, wherein the recommended action comprises one of (a) administrative review or (b) administrative approval of the one or more access permissions for the target user; and generating a notification of the recommended action with respect to the one or more access permissions for the target user.

17. The system of claim 16, wherein computing the individual similarity score between the plurality of users and the target user comprises classifying the target user as one of an outlier or an inlier with respect to the plurality of users.

18. The system of claim 16, the program instructions further causing the system to perform an operation comprising:

determining one or more factors that contributed to determining the recommended action;

wherein determining the one or more factors comprises analyzing the weighted values for the plurality of attributes.

19. The system of claim 16, wherein computing the aggregate similarity score of the plurality of users comprises:

computing respective peer similarity scores for a plurality of groupings of the plurality of users across the plurality of attributes; and computing the aggregate similarity score as a function of weighted values of the respective peer similarity scores.

20. The system of claim 16, wherein the one or more access permissions comprise one or more of: a particular access permission associated with an application; a set of a plurality of access permissions associated with the application; or a user role.

* * * * *